Oct. 7, 1941.  H. G. JOHNSTONE ET AL  2,258,290
COMPUTING MACHINE
Filed May 13, 1936   6 Sheets-Sheet 1

INVENTORS
H. G. JOHNSTONE
J. C. GATES
BY H. R. Whitehorn
ATTORNEY

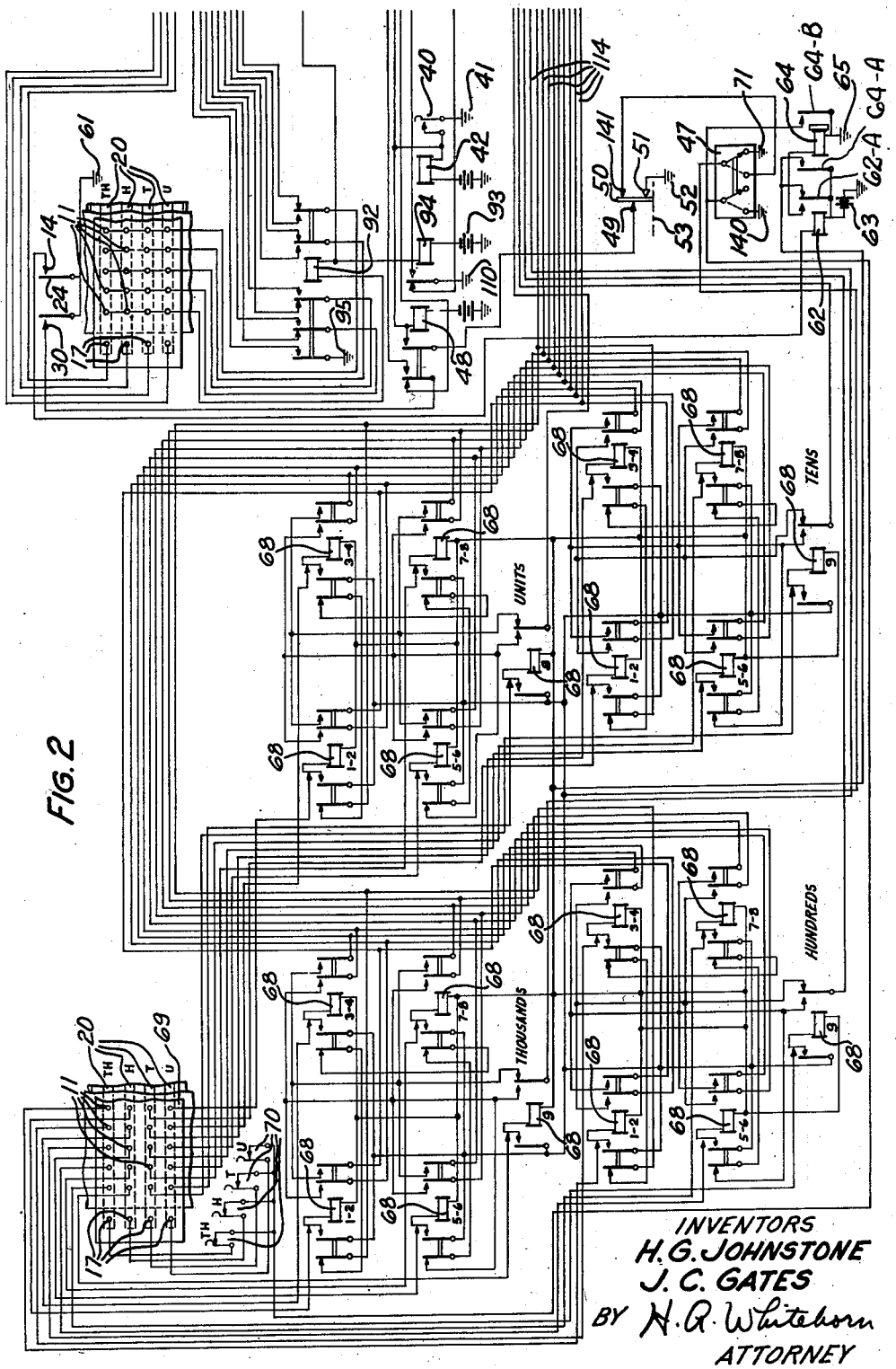

Oct. 7, 1941.  H. G. JOHNSTONE ET AL  2,258,290

COMPUTING MACHINE

Filed May 13, 1936  6 Sheets—Sheet 5

INVENTORS
H.G. JOHNSTONE
J.C. GATES
BY Emery Robinson
ATTORNEY

Oct. 7, 1941.   H. G. JOHNSTONE ET AL   2,258,290
COMPUTING MACHINE
Filed May 13, 1936   6 Sheets-Sheet 6

INVENTORS
H.G. JOHNSTONE
J.C. GATES
BY Emery Robinson
ATTORNEY

Patented Oct. 7, 1941

2,258,290

UNITED STATES PATENT OFFICE 2,258,290

COMPUTING MACHINE

Harold G. Johnstone, Berwyn, and John C. Gates, Downers Grove, Ill., assignors to Western Electric Company, Incorporated, New York, N. Y., a corporation of New York Application May 13, 1936, Serial No. 79,462

5 Claims. (Cl. 235—61.6)

This invention relates to computing machines, and more particularly to card controlled multiplying machines operable under control of record cards in which digits are represented by a combination of holes.

One object of the present invention is the provision of a multiplying machine operable under control of cards on which the digits of computations are in combinational hole form.

Another object of the invention is the provision in a multiplying machine of means for retaining one of the factors of a computation in the machine, which factor is common to a series of multiplications.

In accordance with one embodiment of the invention, there is provided a multiplying machine equipped with a pair of sensing heads for engaging a perforated card to take the factors of a problem from each card of a series of cards. In this embodiment of the invention, the sensing heads have a plurality of pins which complete electrical circuits through holes in the cards, which holes represent the digits of the factors in the so-called combinational form, that is, a digit may be represented by one or a plurality of holes. The circuits, thus completed, translate the combinational hole representations of numbers punched in the cards to circuits representing digital values in denominational orders for controlling the multiplying mechanism. An electromagnetically operated storage device is provided which, under card control, may store a factor taken from a card in the storage device to control the multiplying apparatus in accordance with other factors taken from individual cards of a series of cards.

A better understanding of the invention will be had by reference to the following detailed description taken in conjunction with the accompanying drawings, wherein Fig. 1 is a fragmentary view of a sensing head which may be used in taking information from cards to control a multiplying mechanism of the type covered by the present invention;

Figs. 2 and 3 are circuit schematics which, when placed with Fig. 2 to the left of Fig. 3, disclose the electrical circuits of the to be described embodiment of the present invention;

Figure 5:
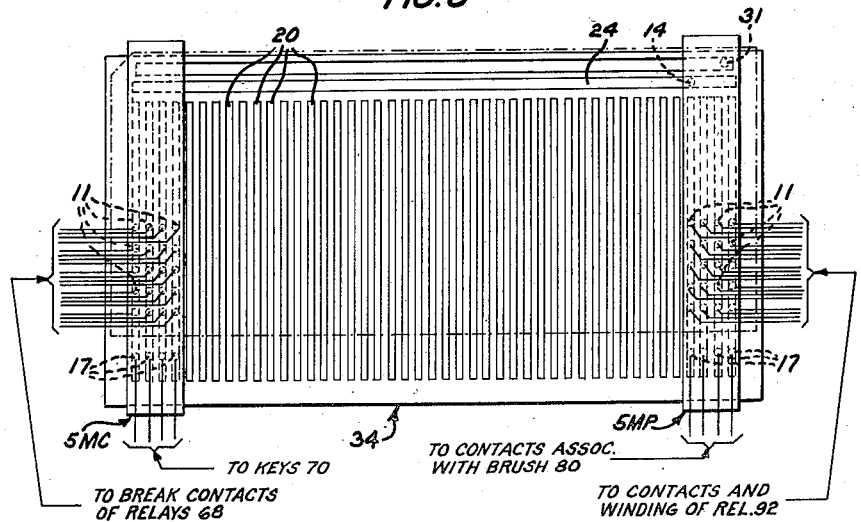
Fig. 5 is a schematic view of the two sensing heads positioned to sense the extreme areas of the card and shows the relative position of the sensing heads and their associated apparatus.
Figure 6:
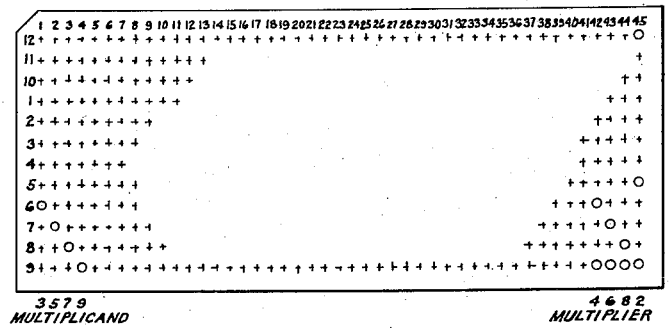
Figure 7:
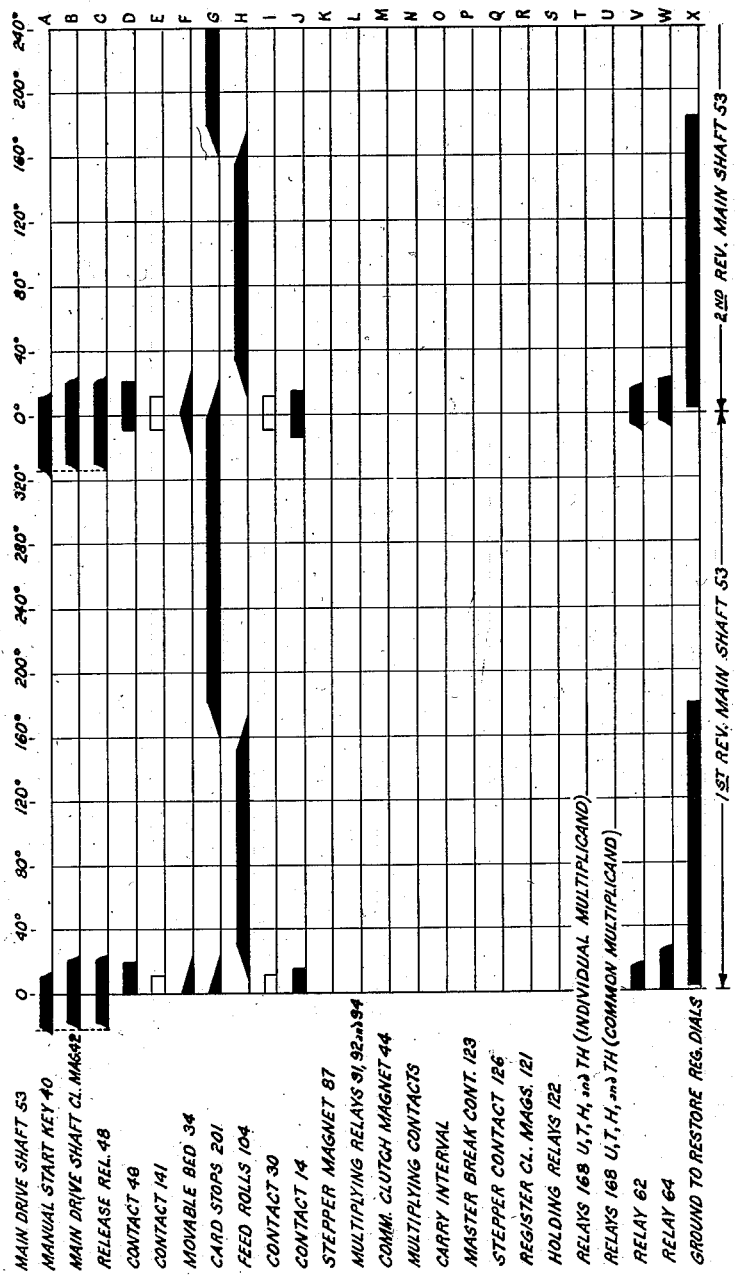
Figure 7A:
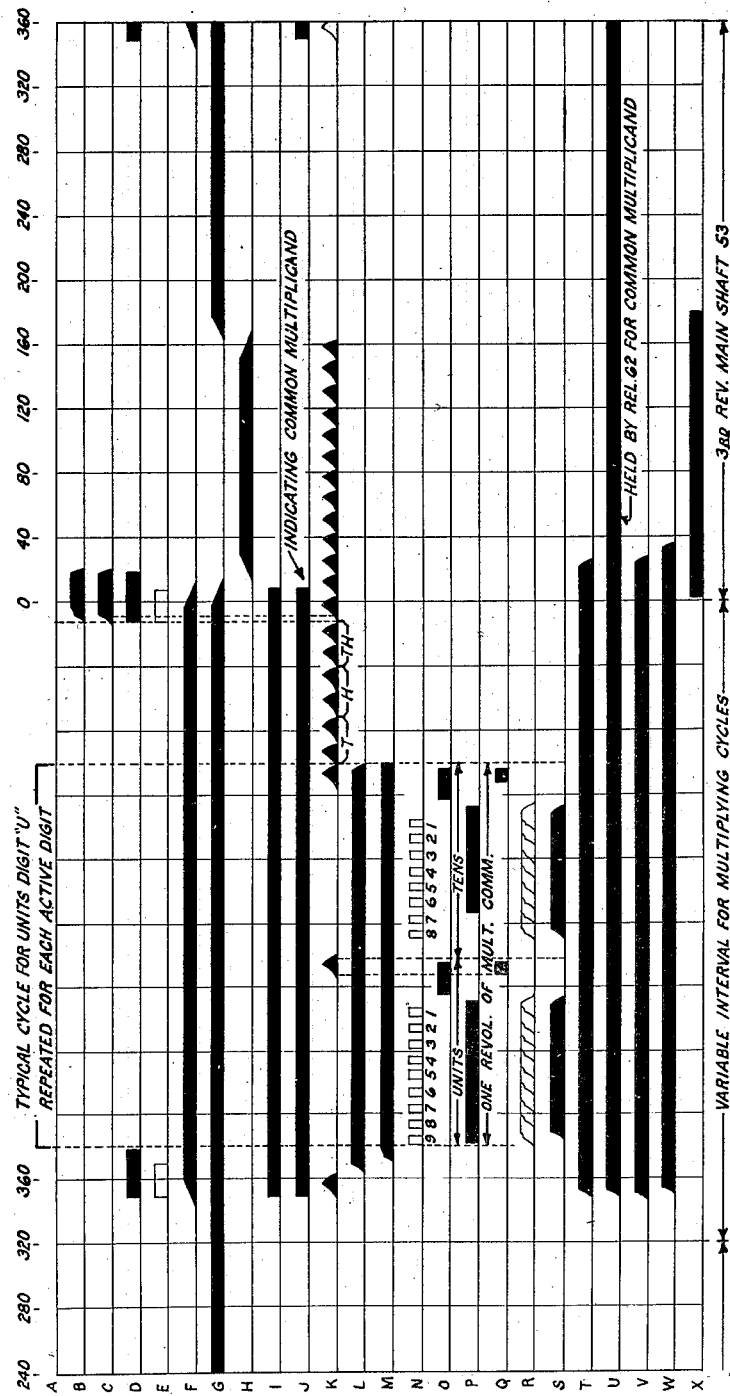

Fig. 6 is a view of a tabulating card perforated to control the sensing heads in the position as shown in Fig. 5 with the number 3479 perforated in the multiplicand area thereof and the number 4692 perforated in the multiplier area thereof; and Figs. 7 and 7—A show, diagrammatically, the timing of the various parts of the apparatus shown in the circuit and when placed with Fig. 7—A to the right of Fig. 7, will provide a timing chart of the apparatus shown in the circuit.

Before referring to the drawings in detail, it may be noted that the multiplying apparatus forming a part of the combination constituting the present invention is substantially the same as the multiplying apparatus disclosed in detail in the co-pending application of Harold G. Johnstone Serial No. 436,135, filed March 15, 1930. Furthermore, it should be noted that the card feeding and card sensing mechanisms are substantially the same as that disclosed in the aforementioned Johnstone application with the specific exceptions to be enumerated in the detailed description of the present invention. In the following description, the specific details of the method of recording or registering the results effected by the multiplying mechanism have not been described in detail since for the purpose of this disclosure the results might be registered on a visual indicating type of register, or might be recorded in statistical cards in the form of perforations by a mechanism such as that shown in the patent to Harold J. Johnstone No. 2,099,892, issued November 23, 1937, Serial No. 1,840, filed January 15, 1935. Accumulating registers of the type particularly adaptable for use with the multiplying mechanism shown herein are also shown in Patents Nos. 2,096,429, 1,952,868 and 2,034,260 issued on October 19, 1937, March 27, 1934 and March 17, 1936, respectively, to Harold G. Johnstone.

Figures 1, 4:
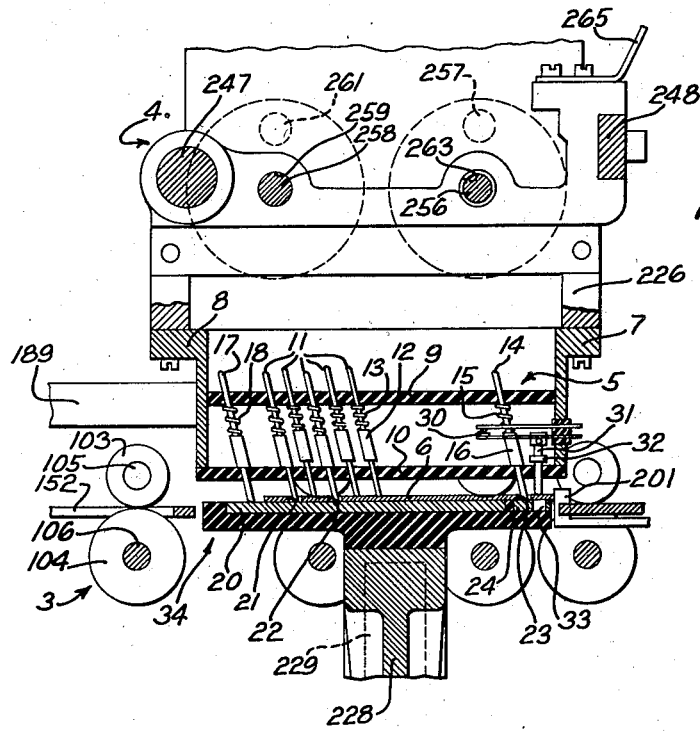
Fig. 4 is a view showing a statistical card for controlling a machine of the type covered by the present invention.

Referring now to the drawings wherein like reference characters indicate similar parts throughout the several views, there is shown in Fig. 1 a portion of a sensing mechanism which might be mounted in a card controlled multiplying machine such as that shown in Johnstone application Serial No. 436,135. For the sake of simplifying the present disclosure the various parts shown in Fig. 1 which correspond to parts in the Johnstone application Serial No. 436,135 have been assigned similar reference numerals i. e., the sensing mechanism has been designated generally with the numeral 4, and the card feed mechanism has been designated generally with the numeral 3. In like manner the upper and lower card feed rollers have been numbered 103 and 104 and their shafts have been numbered 105 and 106, and the base plate upon which a card would be fed in passing from the magazine (not shown) to the card feed rollers is designated 152. The stop member for stopping a card under the sensing heads has been designated 201. In like manner, the sensing head 226, casting 228, guide rods 229, rods 247 and 248, threaded rod 256 and crank 257, threaded rod 258, threaded aperture 259 and crank 261, aperture 263 and pointer 265 are assigned reference numerals the same as those used in the aforementioned Johnstone application.

A pin box 5 replaces the structure shown in the Johnstone application Serial No. 436,135 since in the Johnstone application the cards being sensed were the usual 45 column cards having twelve hole positions in each column any one of nine of which could be perforated to represent a digit, whereas in the present case the same type of card is used but is divided longitudinally into two parts, an upper half and a lower half, and a combinational hole system is used so that the digits 1, 3, 5, 7 and 9 are represented in a card by a single perforation, and the digits 2, 4, 6 and 8 are represented in a card by two perforations. The combinational hole system used is clearly shown in Fig. 4, wherein a record card 6 is shown with apertures in its first nine columns on the lower half of the card representing the numbers 1, 2, 3, 4, 5, 6, 7, 8 and 9, from left to right, respectively.

It will be understood that in the apparatus shown, each of the factors has been limited to four digits to simplify the disclosure and that the card shown in Fig. 4 does not represent a card adapted particularly for use in this machine, but simply shows the code used in cards which may be used in the machine. It also should be understood that the machine is adapted to sense a multiplicand from any four adjoining columns of the card by moving the pin boxes 5 to the proper position, the only limitation being the pin box 5, for the multiplicand may be moved to sense a factor from any four adjoining columns of the card from column 1 to column 41 and that the multiplier pin box 5 may be positioned to sense any four adjoining columns of the card from column 5 to column 45, as shown in Figs. 4 and 6.

The pin box 5, which replaces the pin box shown in the Johnstone application Serial No. 436,135, is secured to the sensing head 226 and carries a plurality of sensing pins 11 of which there are provided in the present embodiment five pins to a column, and four columns to a pin box, so that four columns of the card may be sensed simultaneously. The sensing pins are positioned between a pair of plates 9 and 10 perforated to receive extending ends of the pins, and have springs 13 surrounding the upper end of each pin and engaging the upper plate 9 and a shoulder 12 formed on each sensing pin to normally urge the sensing pins downwardly to a position where the lower end of the shoulder 12 will engage the lower plate 10. The plates 9 and 10 are secured to the sensing head 226 by means of end plates 7 and 8. One of the pin boxes 5, for example, the pin box for sensing the multiplicand, carries a sensing pin 14 similar to the pins 11 and urged downwardly by a spring 15 surrounding the upper end of the pin and interposed between the upper plate 9 and a shoulder 16 formed adjacent the lower end of the pin.

All of the aforementioned sensing pins are adapted to engage the card 6 in a card sensing operation. There are also provided four sensing pins 17 of exactly the same construction as the pins 11 and having springs 18 associated therewith for normally urging them downwardly (Fig. 1). These sensing pins 17 are in direct alignment with each column of five pins 11, but when a card 6 is in position against the stop member 201 and the card has been moved upwardly to engage the pins, the sensing pin 17 will not engage the surface of the card but will engage a bar 20 of conducting material to the left (Fig. 1) of the card. The pins 11, if they are in alignment with holes in the card as indicated at 21 and 22, will pass through the card and engage the bar 20. If a hole 23 is punched in the card in alignment with the sensing pin 14, the pin 14 will engage a conducting member 24. A pair of card actuated contacts 30 are mounted on the pin box 5 and adapted to be actuated by a plunger 31 provided with a shoulder 32 which normally engages the lower plate 10 being forced into engagement therewith by one of the springs of the pair of contacts 30. However, when a card is in place under the sensing head, the plunger 31 will be moved upwardly (Fig. 1) to close the pair of contacts 30. When there is no card in place under the sensing head, the lower end of the plunger 31 will pass into a hole 33 in the movable bed 34 in which the bars 20 and conducting member 24 are mounted. This bed is formed of insulating material and is mounted upon the upper end of casting 228.

The pin boxes 5 may be adjusted across the top of the movable bed 34 for columnar selection of perforations in a card by manipulating the cranks 257 and 261. After the pin boxes have been adjusted to make the desired columnar selection, the movable bed 34 may, in the operation of the machine, be moved vertically to sense the cards fed onto it by carrying the cards up into engagement with the pins in the pin box 5.

As shown in Fig. 5, the pin box 5 for the multiplicand and multiplier, which have been designated 5 MC and 5 MP, respectively, are adjusted to their extreme outer positions where the pins thereon are in association with the four columns in which perforations may appear at opposite ends of the card. It will be understood that these pin boxes may be adjusted over the card so that the pin box 5 MC may be moved into association with any series of four bars 20 from the bar designated 1 to the bar designated 41, whereas the pin box 5 MP may be associated with any series of four adjacent bars 20 from the bar designated 5 to the bar 45. Since the pin boxes 5 MC and 5 MP have been shown, in Fig. 5, in their extreme positions, the card shown in Fig. 6 has the multiplicand 3479 and multiplier 4682 shown perforated in rows 1, 2, 3 and 4 and in rows 42, 43, 44 and 45, and a perforation in the area to be sensed by the pin 14 has been shown in the upper row of the card to illustrate a possible problem which the apparatus forming the subject matter of this invention is capable of computing. This example is discussed more in detail hereinafter.

It will thus be apparent that when a card is advanced from the hopper (not shown) onto the movable bed 34 and into engagement with the stop member 201 and the movable bed 34 is moved upwardly in the manner described in detail in Johnstone application Serial No. 436,135, the sensing pins 11 and 14 will make contact with the upper surface of the card 6 or will pass through holes in the card and engage the bars 20 and conducting member 24, respectively. At the same time, the sensing pin 17 will engage the left end (Fig. 1) of each of the bars 20 under the sensing heads, and the pair of contacts 30 will be closed by the plunger 31 due to the presence of a card under the sensing heads. When the stop member 201 is moved out of the path of the card and the movable bed 34 is moved downwardly, the card will be fed out from under the sensing head and to a suitable receptacle (not shown). The method of recording the result, since it does not form a part of this invention, is not being disclosed in detail and this record may be either in the form of a visually indicated registration, or the card may have the result perforated therein by mechanism such as that shown in the Johnstone Patent No. 2,099,892.

It is believed that a better understanding of the invention will be had by describing the circuit in connection with a specific problem and, for example, it will be assumed that the cards to be sensed have been perforated in the following manner:

The first card has the number 3579 punched therein in the area to be sensed by the multiplicand sensing head, and the number 4682 has been punched therein in the area associated with multiplier sensing head. Further, let it be assumed that the first card in the group of cards bears a punching in the area thereof associated with the sensing pin 14, and that the second card in the series of cards bears the number 1357 in the area thereof associated with the multiplier sensing head. Also let it be assumed that the third card has the number 2468 perforated therein in the area associated with the multiplicand sensing head, the number 2159 in the area thereof associated with the multiplier sensing head, and a perforation therein in the area associated with the sensing pin 14. It will be noted in the assumed problems that there was no multiplicand perforated in the second card. Under such conditions the multiplicand which was punched in the first card will be assumed to be common to the first and second cards.

Figure 3:
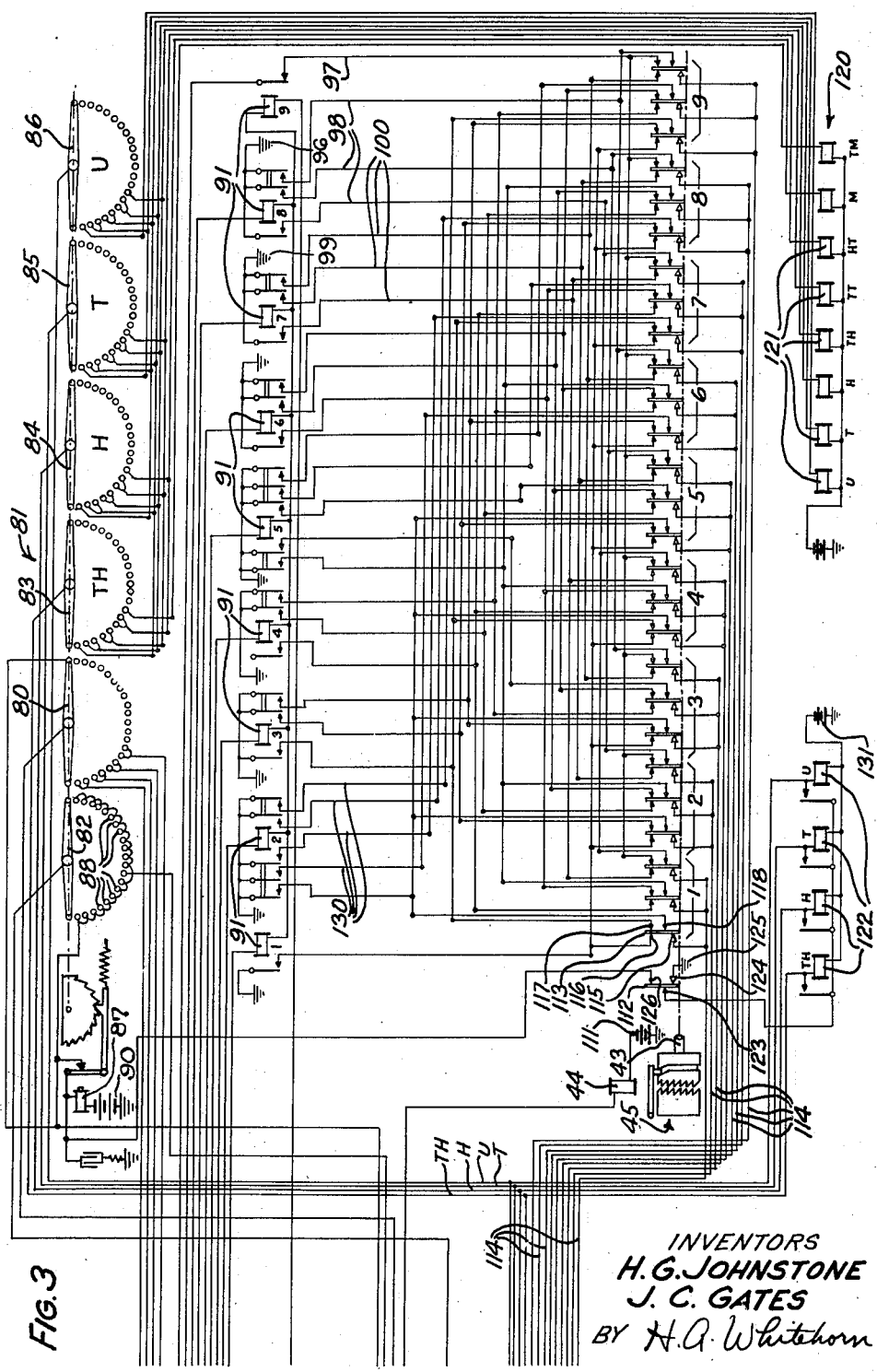

Referring now to Figs. 2 and 3, the circuit for performing the multiplications outlined hereinbefore for the series of three cards will now be described in detail. On Fig. 2 there is shown a start key 40 which may be of the usual non-locking type which, upon operation, will connect ground at 41 momentarily to the winding of a main drive shaft clutch magnet 42 to start the machine in operation. The main drive shaft clutch being assumed to be a conventional single revolution clutch which will upon engagement drive the main drive shaft through one revolution.

It will be assumed that a supply of cards has been placed in the magazine (not shown) and that the operation of the main drive shaft clutch magnet 42 will connect the main drive shaft for the machine with a source of power in a manner similar to that disclosed in the Johnstone application Serial No. 436,135, suitable gearing being provided for operating the feeding of cards and the reciprocation of the movable bed 34 in a predetermined timed relation in the conventional manner, and suitable gearing being provided for supplying power to drive a commutator shaft 43 shown schematically in Fig. 3 provided its associated commutator clutch magnet 44 has been operated. It will be noted at this time that the commutator shaft 43 does not immediately start in operation but waits until the sensing mechanisms have performed their functions and then, as will be described hereinafter. the clutch magnet 44 will be energized to permit the operation of a single revolution clutch 45 in the well known manner. With the assumed series of problems to be performed by the machine, the machine must be set to operate with a common multiplicand, and, accordingly, a common multiplicand switch 47 must preliminarily be moved to the position shown in full lines (Fig. 2). The first operation of the start key 40 will cause cards to be fed from the magazine (not shown) to position to be engaged by the card feed rollers. However, the magnet 42 must be operated twice in order to feed the first card of the series of cards placed in the magazine (not shown) to the sensing head, as described in the aforementioned Johnstone application.

Upon operation of the start key 40, the clutch magnet 42 will be energized, as will a release relay 48 connected in parallel with the clutch magnet 42, and a locking path will be established by the release relay 48 to a brush 49 associated with a contact disk 50 mounted on the main drive shaft of the machine. The contact disk 50 has a brush 51 connected to ground at 52 and associated therewith and in engagement with a conducting portion of the disk 50 at all times. The brush 49 engages the conducting material of the disk 50 in the normal position of the main drive shaft shown schematically in Fig. 2 and designated 53, and the brush 49 will continue to engage conducting material of the disk until the shaft 53 has moved approximately twenty degrees. The provision of this locking ground from 52 through the brushes 51 and 49 and contact disk 50, insures the positive operation of the clutch associated with clutch magnet 42, which clutch is as noted hereinbefore of the conventional single revolution type. One revolution of the main drive shaft will cause the advancement of a card from the magazine (not shown) to engagement with the card feed rollers, and a second operation of the main drive shaft clutch magnet 42, due to the operation of the key 40, will advance the card into position under the sensing head and against the stop member 201.

It will be understood that the movable bed will move through its cycle as disclosed in the aforementioned Johnstone application, and as soon as a card arrives in position under the sensing heads, the movement of the movable bed 34 upwardly will, with the assumed set of problems, cause the sensing pin 14 to engage the conducting member 24 to complete a circuit from ground at 61 through the conducting member 24 and sensing pin 14 and winding of a relay 62 to grounded battery at 63, thereby energizing the relay 62. Energization of the relay 62 will connect the grounded battery at 63 through make contact of relay 62 and winding of a slow release relay 64 to ground at 65. The armature of relay 62 has been designated 62—A and the armatures of relay 64 have been designated 64—A and 64—B to clearly illustrate which armatures are operated by the respective relays.

Shortly after the sensing pin 14 engages the conducting member 24, the sensing pins 11 which find holes in the card in the area of the card associated therewith and the sensing pins 17, will engage their associated bars 20 to selectively energize multiplicand relays 68 associated with the multiplicand sensing head 69 over a circuit from ground at 65 through the make contact of slow release relay 64 through digit omitting keys 70—U, 70—T, 70—H and 70—TH for the units, tens, hundreds, and thousands orders of the multiplicand, respectively, to the bars 20 in the units, tens, hundreds and thousands orders of the multiplicand sensing head 69. The ground at 65 connected to the bars 20 will be continued through each of the holes perforated in the card, to represent digits in the various denominational orders, through the make before break contacts of the multiplicand relays 68 and through the windings of the energized multiplicand relays 68 to grounded battery at 63 through the left hand make contact of the slow release relay 64.

With the common multiplicand switch 47 in the position shown, ground at 71 will be connected through the switch to the left hand make contact of the energized relays 68 to hold these relays energized through their left hand make contact and winding to grounded battery at 63 over the make contact of the slow release relay 64, or the break contact of relay 62. From the foregoing, it will be apparent that any relay 68 which has been energized will remain energized until the relay 62 is energized after having been energized and deenergized. This function is accomplished through the slow releasing of slow release relay 64 which, when energized, will make on its left hand contact to supply the grounded battery at 63 to the multiplicand relays 68, and will hold that grounded battery on the windings of the multiplicand relays for a short time after the release of relay 62, whereby relay 62 being an ordinary relay will, upon release connect grounded battery at 63 through its break contact before the path from grounded battery at 63 is broken by the slow release relay 64. In this manner if the common multiplicand switch is in the position shown in full lines (Fig. 2), a multiplicand stored in the multiplicand relays 68 will remain stored therein until relay 62 is operated a second time due to the finding of a hole in a sensed card in the area thereof associated with the sensing pin 14.

There are provided twenty relays 68, five in the units order, five in the tens order, five in the hundreds order, and five in the thousands order. Each order, however, represents the nine positive digits of a decimal notation, for example, if the relay 68 designated (1 and 2) in any order is operated over the circuit through the card, and no other relay 68 in that order is operated, a live circuit representing the digit 1 should be connected to the multiplying machanism and, in like manner, if the relay 68 designated (3 and 4) or (5 and 6), or (7 and 8), or (9) is energized, the digits 3, 5, 7 or 9, respectively, should be transmitted to the multiplying commutator, and if the multiplicand relay 68 designated (1 and 2) and the multiplicand relay designated (9) or the relay designated (3 and 4) and the relay designated (9) or the relay (5 and 6) and the relay (9), or the relay (7 and 8) and the relay (9) are energized, the digits 2, 4, 6 and 8, respectively, are indicated and circuit connections representative of these digits will be transmitted to the multiplying commutator.

The setup of the multiplicand relays will, therefore, condition circuits which will be described more in detail hereinafter, for controlling the multiplicand portion of the multiplying mechanism. In the specific description of the selected problems, these connections will be described in detail.

As soon as the selected ones of the multiplicand relays have been energized to effect the storage of the multiplicand digits, the further movement upwardly of the movable bed 34 will effect the closure of the card actuated contact 30 to connect ground at 61 over the break contact of release relay 48 which has by this time been deenergized to a brush 80 of a stepper switch which constitutes the distributor, indicated generally by the numeral 81, of the multiplying mechanism. The brush 80 is one of a series of six brushes, the others of which are designated 82, 83, 84, 85 and 86 mounted upon a common shaft and adapted to be moved upon the release of an electromagnet 87. This stepper switch is of the conventional type which is provided with the usual pawl and ratchet mechanism, and wherein the operation of its associated electromagnet 87 will move the pawl against the energy stored in a spring to prepare it for operation by the spring upon the deenergization of the electromagnet. A switch of this type is shown in detail in Patent No. 2,061,277, issued to H. G. Johnstone on November 17, 1936. The brushes 82 to 86, inclusive, are non-bridging, that is, they are of such width as to engage only one of their associated contacts at a time and will be disconnected from a contact before they engage a succeeding contact, whereas the brush 80 is of the bridging type and will engage a succeeding contact before disengaging from the next previous contact.

The circuit described hereinbefore for connecting ground at 61 through the card actuated contact 30, break contact of release relay 48, to the brush 80, which is in engagement with the twenty-second contact of its associated group of contacts 88, will be continued through the twenty-second contact 88 and an armature associated with the electromagnet 87, through the winding of the electromagnet to grounded battery at 90. As soon as the electromagnet 87 is energized over this circuit, it will attract its armature and break the circuit just described, whereby upon the deenergization of the electromagnet 87, the brushes 80, 82, 83, 84, 85 and 86 will all step onto their first contacts 88.

As soon as the brush 80 engages its first contact, the circuit through the brush from ground at 61 through card controlled contacts 30, break contact of the release relay 48 will be continued through the brush, the first contact 88 associated with the brush 80 to the sensing pin 17 in the units order for the multiplier sensing mechanism and ground will be picked up from the bar 20 in the units order by the brush or brushes 11 which have found holes in the card in the areas associated therewith to selectively energize one or more of a group of multiplier relays 91.

There are nine multiplier relays 91 representative of the digits 1 to 9, and these relays control through their contacts the input of the multiplier factor to the multiplying mechanism. The ground supplied by the brush 80 through its associated contacts 88, through the sensing pins 17 to the bar 20 in the units order, will be picked up by the sensing pin or sensing pins 11 which find holes in the card in the area thereof associated with the pins.

There are, as pointed out hereinbefore, five sensing pins 11, and these sensing pins must translate a combinational hole representation of a digit into a live circuit representing any one of nine digits. For example, if the left hand pin 11 is the only one that finds a hole in the card, ground will be picked up from the bar 20 and passed through that sensing pin 11 to energize a relay 92, which is connected to grounded battery at 93 through the winding of a relay 94. Energization of relay 92 will connect ground at 95 over the break contact of the relay 91 (9) for the digit 9. If the first and second pins 11 from the left find holes in the card, the relay 92 will be energized over the circuit just described, and in addition ground through the second pin 11 from the left (Fig. 2) will be connected through a make contact of relay 92 to multiplier relay 91 (8) and through the winding of the relay 91 (8) and relay 91 (9) and the relay 94 in series to grounded battery at 93, thereby energizing the relays 91 (8), 91 (9) and 94. Energization of relay 91 (9) will open the contacts associated therewith to remove ground at 95 from multiplier lead 97 leading from the relay 91 (9) and the energization of relay 91 (8) will connect ground at 96 to the multiplier leads 98 leading from the multiplier relay 91 (8) thereby to set up the multiplier digit 8.

If the sensing pins 11 find a hole in the card in the area associated with the second pin 11 from the left and do not find any other holes, the relay 92 will not be energized and ground will be connected over a break contact of relay 92 (not energized) to the winding of multiplier relay 91 (7), thereby to connect ground at 99 over multiplier leads 100. The ground through the multiplier relay 91 (7) will also go through the multiplier relay 91 (9) and the relay 94 in series to grounded battery at 93. This circuit through the relay 91 (9) serves no purpose at this time. The finding of holes in the card by the sensing pins 11 in the following positions, counting from the left (Fig. 2), the first and third, or third alone, or first and fourth, or fourth alone, or first and fifth, or fifth alone, will, in like manner, energize the relays 91 (6) or 91 (5) or 91 (4) or 91 (3) or 91 (2) or 91 (0), respectively, and the relay 91 (9) will be operated each time one of the other relays 91 (1) to 91 (8) are operated to put ground on the multiplier leads associated with the various multiplier relays 91 in a manner similar to that described for the digits 9, 8 and 7.

Each time the relay 94 is energized, it will connect ground at 110 through its make contact and the winding of commutator clutch magnet 44 to grounded battery at 111, thereby to cause the commutator shaft 43 to rotate through one revolution. Commutator shaft 43 is substantially the same as the commutator shaft of the Johnstone application Serial No. 436,135, and will be described only briefly herein.

The commutator shaft 43 is utilized in the present invention carries a plurality of contact disks twenty-eight in number, of which one designated 112 is used for control purposes, and the other twenty-seven are used for multiplying purposes. The multiplying contact disks have been designated 113. It will be understood that each revolution of the commutator shaft effects the multiplication of all of the digits of the multiplicand by one digit of the multiplier. The ground connections originating at the multiplier relays 91 (1) to 91 (9) being connected at predetermined times in the cycle of rotation of the commutator shaft through certain of the contact disks 113 to multiplicand leads 114. In the first half revolution of the multiplying commutator 43, the units part of the partial product of the selected multiplier digit by all of the multiplicand digits will be sent out over the multiplicand leads, and in the second half of each revolution of the multiplying commutator the tens parts of the partial products of the selected multiplier digit by all the multiplicand digits will be sent out over the multiplicand leads 114. The construction of the multiplying commutator is similar to that shown in Johnstone Patent 1,952,868 of March 27, 1934.

The contact disks 113 each have four brushes 115, 116, 117 and 118 associated therewith. The brush 115, which is indicated by an open headed arrow, is always in contact with a conducting portion of the contact disks, and the brushes 116, 117 and 118 are interconnected with the brush 115 through the conducting material of the contact disks at predetermined intervals. It will be noted that there are three contact disks associated with each multiplicand lead 114 and that the multiplicand leads 114 are connected to the brushes 115 of their associated contact disks. It will thus be apparent that whenever one of the brushes 116, 117 or 118 engages a conducting portion of its associated contact disk, a circuit path will be prepared from the stationary contact of the associated relay 91 (1) to 91 (9) to a multiplicand lead 114.

An accumulator designated generally by the numeral 120 is provided for receiving impulses representative of the partial products transmitted over the distributor 81 from multiplying commutator 43. This accumulator includes a plurality of electromagnets 121, one of which is provided for each denominational order from units to ten millions, inclusive. Any conventional carry-over or transfer mechanism may be provided for effecting carries where indicated. Such a carry-over mechanism is disclosed in the Johnstone application Serial No. 436,135. It is only necessary that the accumulator 120 be of the type which will perform accumulations as determined by the length of time of energization of its electromagnets 121.

As pointed out hereinbefore, the brushes 116, 117 and 118 engage conducting portions of the disks 113 only momentarily and, therefore, it has been necessary to provide a locking circuit to maintain the circuits originally established by the brushes 116, 117 and 118 for holding the electromagnets 121 energized. This locking circuit includes a plurality of holding relays 122 of which there is one provided for each order of the multiplicand. In the present embodiment there being four orders, units, tens, hundreds and thousands in the multiplicand, four holding relays 122 are provided. The holding relays 122 are adapted, upon energization, to lock to ground over a brush 123 associated with the control contact disk 112 and connected at predetermined times in the cycle of contact disk 112 through the disk and a brush 124 to ground at 125. The brush 124, as indicated by the open headed arrow, connects ground to a conducting portion of the disk 112 at all times, and the brush 123 contacts the conducting material of the brush 112 early in each half cycle of the multiplying commutator and continues in engagement with the conducting material long enough to put the highest digit, that is, the digit 9, into a selected accumulator magnet 121.

It will be understood that the contacting portions of the contact disks 113 are the same as those disclosed in the co-pending application Serial No. 436,135 and a further description of the time of making these contacts is, therefore, not believed to be necessary.

Another brush 126 associated with the contact disk 112 makes contact with the conducting portion of the disk toward the end of each half cycle of rotation of the commutator shaft 43 thereby to connect ground at 125 through brush 124 and the contact disk 112 to the winding of the stepper magnet 87 to cause the momentary energization thereof, thereby to step the brushes 80, 82, 83, 84, 85 and 86 one place for each half revolution of the commutator shaft 43. This stepping of the brushes in the distributor 81 will distribute the impulses originating at the multiplying commutator into the proper denominational orders of the accumulator.

Referring now to the specific problems mentioned hereinbefore, let it be assumed that the first card of the three cards described in the assumed problems has been advanced to position under the sensing heads and against the card stop 201 due to the operation of the start key 40 twice in the manner described herein. The operation of the movable bed 34 to move the first card carrying the multiplicand 3479 and multiplier 4682 up against the sensing pins will cause the sensing pin 14 to engage the conducting member 24 to complete a circuit from ground at 61 through the winding of relay 62 to grounded battery at 63, energizing relay 62 and connecting grounded battery at 63 through the make contact of relay 62 and winding of slow release relay 64 to ground at 65. Slow release relay 64 will thus be energized and will connect ground at 65 through its make contact and through the digit omitting keys 70—U, 70—T, 70—H and 70—TH to the sensing pins 17.

Shortly after the relays 62 and 64 are energized, the sensing pins 17 will engage their associated bars 20, and the sensing pins 11 in the units, tens, hundreds and thousands orders of the multiplicand sensing head will find holes in the card in the following sequence: In the units order the left hand pin 11 will find a hole; in the tens order the second pin 11 from the left will find a hole; in the hundreds order the third pin from the left will find a hole; and in the thousands order, the fourth pin from the left will find a hole. The ground supplied to the bar 20 in the units order will be continued through the sensing pin 11, the make before the break contact of relay 68 (9) of the units order, the winding of the relay 68 (9), and make contact of the slow release relay 64 to grounded battery at 63, thereby energizing the relay 68 (9) in the units order, and locking it in its energized position over a circuit from ground at 71 through the common multiplicand switch 47, the left hand make contact of relay 68 (9), winding of relay 68 (9), make contact of slow release relay 64 to grounded battery at 63. The sensing pin 11 in the tens order will connect ground from the bar 20 associated therewith, through the make before break contact of relay 68 (7 and 8), the winding of the relay 68 (7 and 8) and make contact of slow release relay 64 to grounded battery at 63 and this relay will lock up over its left hand make contact to ground at 71 through the operated common multiplicand switch 47.

The third and second sensing pins 11 from the left in the hundreds and thousands orders will engage their respective bars 20 to pull up the relays 68 (5 and 6) and 68 (3 and 4) in the same manner as described in connection with the other relays 68 in the units and tens orders, and these will also lock to ground through the common multiplicand switch and to grounded battery through the left hand make contact of the slow release relay 64. The operation of relays 68 (9), 68 (7 and 8), 68 (5 and 6) and 68 (3 and 4) in the units, tens, hundreds and thousands orders of multiplicand relays, will prepare the multiplicand circuit for operation in a manner to be described.

As the movable bed 34 moved upwardly and found a card 6 in place against the stop member 201, the card operated contacts 30 were closed. This occurred just after the hereinbefore described circuits to the multiplicand relays 68 were completed. The operation of the card operated contacts 30 connects ground at 61 through the break contact of the release relay 48 to brush 80 in the distributor and through brush 80 standing on its twenty-second contact, through the armature of electromagnet 87 to grounded battery at 90, thereby momentarily energizing the electromagnet 87 which, upon energization, will break the above described circuit at its armature to step all the brushes 80, 82, 83, 84, 85 and 86 into engagement with their first contacts. As soon as the brushes 80, 82, 83, 84, 85, and 86 engage their first contacts, brush 80 will connect ground at 61 through the card operated contacts 30, break contact of release relay 48 to the first contact 88 associated with the brush 80, and from the first contact 88 associated with the brush 80 to sensing pin 17 in the units order of the multiplier sensing head, thereby placing ground on the bar 20 in the units order.

The units digit of the multiplier is "2" and, therefore, a hole will be punched in the card 6 in the area thereof associated with the first and fifth pins 11 from the left. The first of these pins, from the left (Fig. 2), in finding the bar 20 grounded, will continue that ground connection through the windings of relays 92 and 94 in series to grounded battery at 93. The fifth pin from the left (Fig. 2) will continue the ground from bar 20 in the units order through a make contact of the relay 92 and the winding of multiplier relay 91 (2), and the winding of the multiplier relay 91 (9) in series to grounded battery at 93 through the winding of the relay 94. Operation of the relay 94 will connect ground at 110 through its make contact through winding of the electromagnet 44 to grounded battery at 111, thereby operating the single revolution clutch 45 to drive the commutator shaft 43 through one revolution or until relay 94 is deenergized. The operation of relay 91 (9) will break the connection from ground at 95 through contact of relay 92 to multiplier lead 97. The operation of relay 91 (2) connected ground over its make contacts to a series of multiplier leads 130 thereby placing ground on the brushes 115 associated with the first, fourth, seventh, tenth, thirteenth, sixteenth, nineteenth, twenty-second, and twenty-fifth contact disks 113 from the left. When the brushes 115 just mentioned engage conducting portions of their associated disks 113, the ground originating at the contacts of the relay 91 (2) will be continued momentarily through the brushes 115 associated with those contact disks over the multiplicand leads 114 to selected ones of the contacts associated with the multiplicand relays 68 in the units, tens, hundreds and thousands orders of the multiplicand.

Since in the units order only the relay 68 (9) has been energized, and in the tens only the relay 68 (7 and 8), and in the hundreds order only the relay 68 (5 and 6) and in the thousands order only the relay 68 (3 and 4) have been energized, these ground paths over leads 114 will be continued in the units order, over the left hand break contacts of relays 68 (1 and 2), 68 (3 and 4), 68 (7 and 8), 68 (5 and 6) and the right hand make contact of relay 68 (9) through the winding of the holding relay 122 (U) to grounded battery at 131. This ground connection will also be connected by a branch circuit through distributor brush 86 in engagement with its first contact 88 to units electromagnet 121 in the accumulator 120. Energization of the units holding relay 122 will cause the relay to lock up to ground at 125 over brushes 123 and 124 associated with the control contact disk 112.

Since as pointed out in the copending application Serial No. 436,135, the time of making a contact between the brushes associated with the multiplying commutator and conducting portions of the contact disks are representative of the multiplication tables, it will be understood that the time of energization of an accumulator electromagnet is determined by the multiplier magnet 91 which is energized, and the multiplicand relay or relays which are energized in each order.

In the tens order of the multiplicand, the relay 68 (7 and 8) was energized and, therefore, the ground through the contacts of multiplier relay 91 (2) over multiplier leads 130 and through the brushes associated with the commutator will be completed through the right hand make contact of relay 68 (7 and 8) and the right hand break contact of relay 68 (9) to the tens holding relay 122, and through brush 85 to the electromagnet 121 in the tens order of the accumulator 120. Similarly since the multiplicand relay 68 (5 and 6) was energized in the hundreds order, the ground circuit originating at the relay 91 (2) will be continued through the commutator and multiplicand leads 114, the right hand make contact of relay 68 (5 and 6) in the hundreds order, break contact of relay 68 (9) to the holding relay 122 for the hundreds order, and through brush 84 in engagement with its first contact 88, to the electromagnet 121 in the hundreds order of the accumulator. The relay 68 (3 and 4) in the thousands order, being the only multiplicand relay in that order which has been energized, will complete a circuit through its right hand make contact and the right hand break contact of relay 68 (9) in that order, to the holding relay 122 in the thousands order, and through brush 83 to the electromagnet 121 in the thousands order of the accumulator 120. It will be understood that these circuits are prepared by the multiplier and multiplicand relays as soon as these relays are energized and are completed at timed intervals in the first half revolution of the multiplying commutator, by the engagement of the brushes in the multiplying commutator with conducting portions of the associated contact disks.

After the multiplying commutator has completed approximately one-half revolution, at which time the units part of the partial product of the units digit, or "2", of the multiplier, times the multiplicand will have been put into the accumulator, brush 126 will engage a conducting portion of the control disk 112 to momentarily energize the stepper switch 87 over a circuit from ground at 125 through the contact disk and brushes and winding of electromagnet 87 to grounded battery at 90. This will result in the distributor brushes all moving into engagement with their second contacts 88.

Thus, after stepping the distributor brushes into engagement with their second contacts, the second half cycle of the multiplying commutator will, over the same leads which have now been shifted by the stepping of the distributor switch into association with higher orders in the accumulator 120, complete circuits representative of the tens part of the partial products of 2×3579. As the multiplying commutator nears the end of the second half cycle, the brush 126 again becomes effective to step the distributor brushes into engagement with their third contacts. This will break the circuit holding the relay 91 (2) energized, due to the removal of the ground connection from the sensing pin 17 in the units order.

The brush 80, being a bridging brush, will engage its third contact before it is completely disengaged from its second contact and therefore the relays 92, 94 and 91 (8) will remain energized since the sensing pin 17 in the tens order will immediately become effective to connect ground at 61 through the card actuated contacts 30, break contact of release relay 48, brush 80 engaging its third contact, the sensing pin 17 in the tens order, the bar 20 in the tens order associated with the multiplier sensing head, the first and second sensing pins 11 from the left in the tens order which have found holes in the card 6, the relays 92, 94, 91 (8) and 91 (9) in series to grounded battery at 98. The completion of this circuit will connect ground at 96 through the contacts of the multiplier relay 91 (8) to multiplier leads 98, and the next revolution of the multiplying commutator 43 will transmit the result of the multiplication of the digit 8×3579 into the proper orders of the accumulator 120. Similar circuits will be completed to effect the multiplication of the digits 6 and 4 in the multiplier by the digits 3579 in the multiplicand and to transmit the partial products of such multiplication to the proper orders of the accumulator 120.

The distributor brushes will be stepped at the proper time into engagement with their fourth, fifth, sixth, seventh and eighth contacts and near the end of the fourth complete revolution of the multiplying commutator 43, brush 126 will cause the distributor to step its brushes into engagement with the ninth contacts. In so doing, brush 80 will engage a contact not connected to any sensing pin 17 and relay 94 will be deenergized whereupon ground at 110 will be connected through the break contact of relay 94 and brush 82, in engagement with its ninth contact, to operate release relay 48. Deenergization of relay 94 will stop the rotation of the multiplying commutator shaft due to the release of clutch magnet 44, and ground at 110 over the break contact of relay 94 will cause the successive making and breaking of the circuit from ground at 110 through brush 82 to successive contacts 88 associated with brush 82 to energize the electromagnet 87 repeatedly and rapidly to return the brushes into engagement with their twenty-second contacts.

The return of the brushes 80, 82, 83, 84, 85, and 86 in the distributor 81 will reset the multiplying machine for the performance of another problem. During this resetting operation the result in the accumulator 120 may be read therefrom or transmitted to any suitable recording device for recording the result. Also during this resetting operation, the accumulator 120 may be returned to normal or zero indication by means fully set forth in any of the previously mentioned Patents 1,952,868, 2,096,429 and 2,099,892. As the brush 82 makes contact with its ninth contact 88 and thereby energizes the release relay 48, a new card feeding cycle is initiated due to the completion of a branch circuit through the clutch magnet 42, and the release relay will lock up over its locking contact to ground at 52 through the brushes 49 and 51 as described hereinbefore.

This will result in feeding the second card of the series into position against the stop member 201 and under the sensing heads. As the movable bed 34 moves away from the sensing pins in the card feeding cycle, the contact through the card of sensing pin 14 with conducting member 24 will be broken and the card actuated contacts 30 will be opened. The circuit from ground at 61 through conducting member 24 and sensing pin 14 when it breaks, will release relay 62 to transfer grounded battery at 63 from the make to the break contact of relay 62, thereby releasing slow release relay 64 which falls back slowly whereby grounded battery at 63 will be connected through the break contact of relay 62 before it is disconnected from the left hand make contact of relay 64. In this manner the multiplicand relays which had been locked up under control of the first card of the series will not be released at this time. The breaking of the circuit from ground at 61 through the contacts 30, will have no effect since this circuit was also broken at the release relay 48.

As the card cycle proceeds in the same manner as described hereinbefore, the second card in the series having arrived at position under the sensing heads, the sensing head in moving upwardly will carry the second card of the series into engagement with the sensing pins, and since, as pointed out hereinbefore, there is no hole in the second card in the area thereof associated with the sensing pin 14, no circuit will be completed to the pin 14. However, the card operated contacts 30 will be closed and ground will be connected from 61 through the card operated contacts 30 and release relay 48 which at this time will have been deenergized to the brush 80 in engagement with its twenty-second contact 88, thereby initiating a multiplying cycle involving the same multiplicand, but a new multiplier as sensed from the card. Accordingly, the multiplication must proceed to multiply the multiplicand stored in the multiplicand relays 68 by the digits 7, 5, 3 and 1, successively, beginning with the units order. Sensing pins 11 in the multiplier sensing head will find apertures in the card in the following order: The sensing pins in the units order will find a hole in the second hole position from the left, in the tens order the sensing pins 11 will find a hole in the third hole position from the left, the sensing pins 11 in the hundreds order will find a hole in the fourth hole position from the left, and the sensing pins in the thousands order will find a hole in the fifth hole position from the left.

As described in connection with the previous problem, ground is connected through the brush 80 to the bar 20 in the units order first, and therefore this ground connection in the units order will be continued through a break contact of the relay 92 and through the windings of relays 91 (7) and 91 (9) and 94 in series to grounded battery at 93 thereby energizing relays 91 (7), 91 (9) and 94. Energization of relay 94 will cause the energization of electromagnet 44 and start the multiplying commutator 43 in its cycle of rotation. The energization of relays 91 (7) and 91 (9) will break the ground connection to multiplicand lead 97 for the digit 9 and connect ground at 99 to the multiplier leads 100 for multiplier digit 7. The multiplicand digits are the same as in the previous problem, and the first rotation of the multiplying commutator 43 will, as described hereinbefore, cause the multiplicand 3579 to be multiplied by multiplier digit 7 and the result thereof will be accumulated in the accumulator 120. The multiplication of the other multiplier digits by the multiplicand will continue in a manner similar to that described in connection with the multiplication of the digits punched in the first card and the multiplying commutator will go through its four revolutions, whereupon the result of the problem of multiplication having been accumulated by the accumulator 120, the brush 82 will again make contact with its tenth contact 88, to stop the rotation of the multiplying commutator 43 and initiate the next card feeding cycle.

The fourth card feeding cycle which is actually the third effective cycle due to the fact that it requires two cycles to get the first card under the sensing heads, will bring the third card of the series under the sensing heads. As the movable bed 34 moves upwardly to engage the third card of the series, a hole will be found in the area of that card associated with the sensing pin 14 to energize the relay 62 as described in connection with the first card of the series. The energization of relay 62 will break the circuit from grounded battery at 63 through the break contact of relay 62, thereby releasing any multiplicand relays 68 which had been locked up. Further movement of the movable bed 34 as described hereinbefore will result in the locking up of multiplicand relays 68 representative of the multiplicand factor which in this case is 2468. The multiplicand sensing head will find holes in the third card of the series in the following order: In the units order holes will be found by the first and second sensing pins from the left, in the tens order holes will be found by the first and third sensing pins from the left, in the hundreds order holes will be found by the first and fourth sensing pins from the left, and in the thousands order holes will be found by the first and fifth sensing pins from the left.

Since ground at 65 is connected over the make contact of slow release relay 64 to the sensing pins 17 in the multiplicand sensing head at this time, the sensing pins of the units order in finding holes in the first and second hole positions from the left associated with the pins 11, will continue this ground to the left hand break contact of relay 68 (9) in the units order, and through the normally made portion of the make before break contact of relay 68 (7 and 8) to energize these two relays and lock them in their energized position. Similarly the multiplicand relays 68 (9) and 68 (5 and 6) in the tens order, the multiplicand relays 68 (9) and 68 (3 and 4) in the hundreds order, and the multiplicand relays 68 (9) and 68 (1 and 2) in the thousands order will be locked up.

With the multiplicand relays locked up as just described, the rotation of the multiplying commutator will at predetermined intervals in each cycle of its rotation, connect the ground from the effective multiplier relay 91, through the contacts on the disks 113 of the multiplying commutator, first, through the multiplicand lead 114 for the digit 8 to make contact of relays 68 (7 and 8) and the make contact of relay 68 (9) through the distributor switch to the accumulator and directly to the holding relays 122. In the tens order the ground connection through the multiplying commutator will be effective over multiplicand lead 114 for the digit 6 to a make contact of multiplicand relay 68 (5 and 6) and a make contact of multiplicand relay 68 (9) and through the distributor 81 to the accumulator 120. In a similar manner the circuit for the hundreds and thousands order of the multiplicand are effective to control the input of the proper results into the proper denominational orders of the accumulator.

At the completion of the multiplication of 2468×2159 the multiplying commutator will be stopped due to the operation of release relay 48 in the manner described hereinbefore, and the distributor will be returned to its normal position as shown, and succeeding cards may be sensed in automatic succession. Upon the completion of each computation the accumulator may also be returned to normal or zero position as described in the aforementioned Patents 1,952,868, 2,096,429 and 2,099,892.

After the last card has moved out from under the pin box 5, the movable bed 34, in moving up, will carry no card with it and therefore contact 30 will not be closed, whereupon when the distributor returns to normal, as shown, the brush 80 will be disconnected from ground at 61 and the entire machine will come to rest.

The operation of the machine has been described hereinbefore for use with a series of cards having common multiplicands. However, if it is desired to use the machine on a series of cards wherein each card has a separate multiplicand, the multiplicand switch 47 may be moved to its dotted line position so that the multiplicand electromagnets will be released after each card has been sensed. Movement of the common multiplicand switch 47 to its dotted line position will connect ground at 140 to all of the sensing pins 17, thereby placing ground on the bars 20 in every order whenever the movable bed 34 moves upwardly. Furthermore, the ground at 71 will be disconnected from the armatures of the make before break contacts of the multiplicand relays, and this ground will be supplied to the armatures of the make before break contacts of the multiplicand relays 68 at predetermined intervals in the card feeding cycle of the machine through a brush 141 associated with contact disk 50.

If it is desired to use the above described machine with problems involving less than four digits in the multiplicand, the required number of digit omitting keys 70 may be operated to render the sensing pin 17 associated therewith ineffective. Similar keys may be provided in the leads running to the sensing pins 17 in the multiplier sensing head to omit digits therein when less than four digits are present in the multiplier factors of a series of problems, thereby making available for other use the unused columns of the cards.

Throughout the specification and claims the terms "multiplicand" and "multiplier" have been used for convenience in discussing the two factors of a multiplication, but it is to be understood that these terms are interchangeable since either factor may be regarded as the multiplier or the multiplicand.

Although a specific embodiment of the invention is described hereinbefore, it will be understood that the invention is subject to many modifications without departing from the scope thereof which is limited only by the appended claims.

What is claimed is:

1. In a record controlled multiplying machine, means for indicating the result of multiplying a plurality of factors, multiplying means for controlling the indicating means, electrical circuits for controlling the multiplying means, a plurality of sensing means for sensing record cards while stationary, and means associated with one of the sensing means for retaining one of the factors and for effecting with the other sensing means joint control of the multiplying means through said electrical circuits, whereby one factor remains constant and the other factor varies in a series of successive multiplications.

2. In a record controlled multiplying machine, sensing means for simultaneously sensing all digits of the factors from successive record cards, factor entry receiving means for one factor, a multiplying mechanism controlled jointly by said factor entry receiving means and a part of said sensing means, means for controlling said factor entry receiving means for retaining said one factor during a series of computations by said multiplying mechanism whereby a retained factor is multiplied by factors sensed from successive cards, and means for indicating the products computed by said multiplying mechanism.

3. In a record controlled multiplying machine, means for sensing a factor from a record while said record is stationary, means controlled by said sensing means for receiving the said factor, a second means for sensing a second factor from a record while said record is stationary, multiplying mechanisms controlled by said receiving means and said second sensing means to effect multiplication of the sensed and received factors, and means for controlling said factor receiving means to retain one of the factors for successive computations involving a series of other factors sensed from records while said records are stationary.

4. In a card controlled multiplying machine, means for simultaneously sensing all of the digits of multiplier and multiplicand factors from record cards while said record cards are stationary, a plurality of storage relays for storing the digits of one of the factors, a set of relays operable singly under control of a part of said sensing means in the course of multiplication to control multiplication by the other factor, a multiplying mechanism operable under the control of said storage relays and said set of relays for performing multiplication of the two factors, and means for sensing a predetermined control area of each card of a series of record cards from which factor data is sensed to control the operation of the storage relays to determine whether a factor is to be retained for successive computations.

5. In a record controlled multiplying machine, two separate sensing heads for sensing two factors from each of a succession of record cards while said cards are stationary, factor entry receiving means for one factor under control of one of said sensing heads, a multiplying mechanism controlled jointly by said factor entry receiving means and the other of said sensing heads in accordance with a factor received by said receiving means and a factor sensed from a card, means for controlling said factor entry receiving means for retaining said one factor during a series of computations by said multiplying mechanism, and means for indicating the products computed by said multiplying mechanism.

HAROLD G. JOHNSTONE.
JOHN C. GATES.